Patented Apr. 6, 1926.

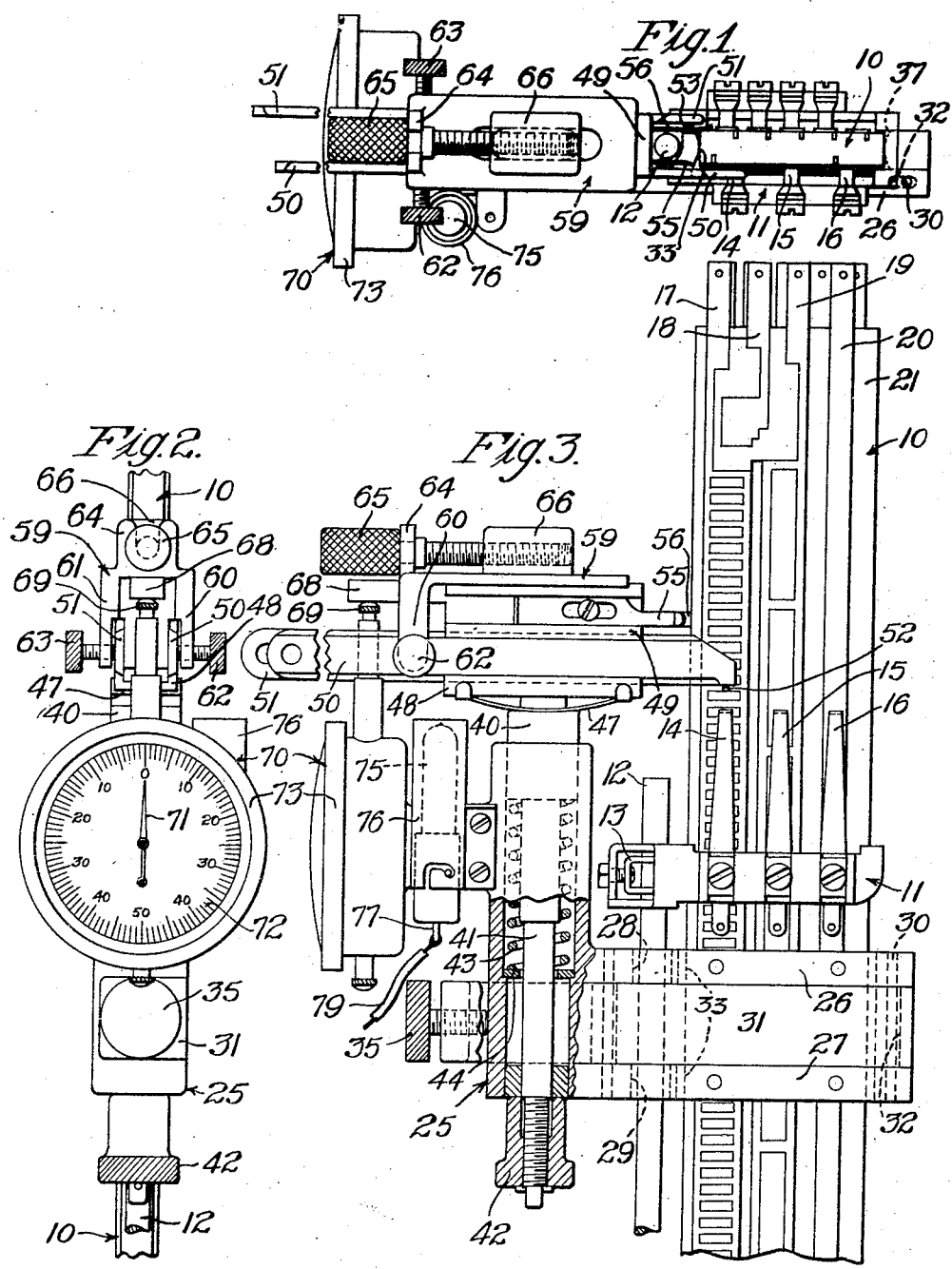

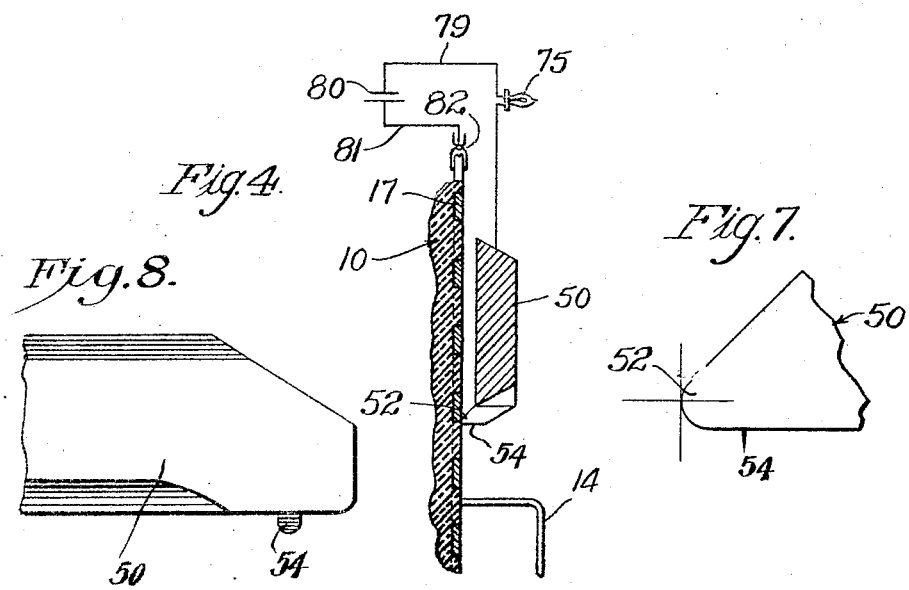
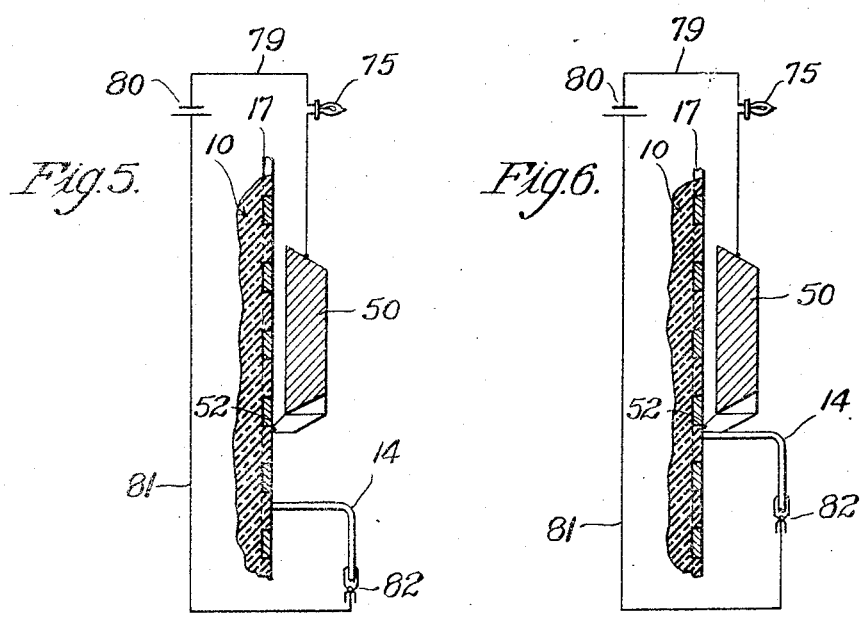

1,579,291

UNITED STATES PATENT OFFICE.

CHARLES BREVET EMERY, OF RIVER FOREST, ILLINOIS, ASSIGNOR TO WESTERN ELECTRIC COMPANY, INCORPORATED, OF NEW YORK, N. Y., A CORPORATION OF NEW YORK.

GAUGING MEANS FOR MEASURING AND ADJUSTING APPARATUS.

Application filed July 14, 1923. Serial No. 651,505.

*To all whom it may concern:*

Be it known that I, CHARLES BREVET EMERY, a citizen of the United States, residing at River Forest, in the county of Cook and State of Illinois, have invented certain new and useful Improvements in a Gauging Means for Measuring and Adjusting Apparatus, of which the following is a full, clear, concise, and exact description.

This invention relates to a gauging means for measuring and adjusting apparatus, and more particularly to a means for adjusting a movable electrical contact co-operating with a fixed contact in telephone exchange apparatus.

In some telephone exchange equipments of the machine switching type a contact brush is moved over a plurality of contact surfaces in steps of predetermined length. Therefore, it is essential that the brush be accurately located on its support so that the contact of such brush will engage and disengage the contact surfaces at the proper times in the travel of the brush. In this connection it is also desirable to insure that the areas of the fixed and movable contact surfaces are within predetermined limits to insure proper contact. Although these results may be accomplished with a sufficient degree of accuracy by visual observation, it is sometimes advisable to check such observation by means not subject to the slight variations which may result from the visual methods.

It is an object of the invention to adjust a member upon a support to properly engage and disengage a surface during a relative movement therebetween.

An additional object is to accurately adjust the commutator brushes employed in panel type machine switching telephone systems.

A further object is to accurately determine the extent of a contact surface.

In order to obtain these objects there is provided in accordance with one embodiment of the invention a fixture which may be readily attached at any desired point to a commutator of a panel type machine switching telephone system. A contact member is supported by the fixture and movable gradually in vertical and horizontal directions over the face of the commutator, the extent of movement in the vertical direction from a predetermined point being indicated by a gauge. An electrical circuit including a signaling device cooperates with the contact member, the commutator contact segments and the associated contact brush to indicate the contacting relation of such elements and the extent of the contact surfaces under various conditions.

These and other features of the invention not specifically mentioned clearly appear from the following description and the accompanying drawings in which—

Fig. 1 is a plan view of the fixture attached to a commutator of a machine switching telephone exchange system;

Fig. 2 is a fragmentary front view thereof;

Fig. 3 is a side elevation partially in section of a portion of the commutator with the fixture mounted thereon;

Figs. 4, 5, and 6 show diagrammatically the relation of the contact member carried by the fixture to the commutator segments and the associated brush, as well as the indicating circuit employed in connection therewith, Fig. 7 shows an enlarged fragmentary view of the contacting point of the fixture, Fig. 8 shows an enlarged fragmentary view of the contacting member and the contact point.

Referring to the drawings in detail, in which similar reference characters are employed to denote similar parts throughout the various views, 10 indicates a commutator of a type frequently employed in telephone exchange equipments of the machine switching type. A multi-contact brush 11 attached to a brush rod 12 by means of a clamping device 13 is adapted, in the operation of the telephone exchange system, to move resilient spring contact members 14, 15, and 16 vertically over the commutator. The commutator 10 may consist of metal strips, such as 17, 18 19, and 20, embedded in a block of insulating material 21. Certain of the contacting strips such as 17 and 19 may have a plurality of segments, the surfaces of which are embedded flush with the surface of the insulating material 21 so as to present a plurality of conducting segments spaced by insulating material. Although in the use of such a commutator and the associated apparatus the brush and the supporting rod are mounted upon a suitable framework and the contact surfaces may be suitably connected to the operating circuits of the exchange, such features are not essential to a complete understanding of the invention and have, therefore, been omitted from the drawings.

The fixture or bracket 25 has two parallel horizontally disposed arms 26 and 27, which are provided with clearance channels 28 and 29 respectively for the brush rod and with rounded lugs 33 (Fig. 1) adapted to bear against the front edge of the commutator 10. These arms extend across the face of the commutator 10 and are insulated therefrom in any suitable manner as by means of strips of fiber, and are interconnected near their extremities by vertical pins 30. A horizontal member 31 is mounted between the arms 26 and 27 by the pins 30, which pass through vertical elongated openings 32 in the member 31, these openings being of such a size as to permit a substantial longitudinal movement of the member 31. The front end of the member 31 is formed at right angles to the main portion thereof and a set screw 35 threadedly engaging such right angled portion and bearing against the front of the bracket 25 serves to move the member 31 forward so that a rounded lug portion 37 (Fig. 1) carried thereby presses against the back edge of the commutator and cooperates with the rounded lugs 33 on the arms 26 and 27 bearing against the front edge of the commutator to securely clamp the entire fixture to the commutator. The vertical portion of the bracket 25 is hollow and contains a plunger 40 carried by plunger rod 41, the lower end of the rod being threaded and engaging a thumb nut 42 which bears against the lower surface of the bracket. A spring 43 surrounding the rod 41 and placed between a washer 44 supported upon a shouldered portion of the interior wall of the vertical portion of the bracket 25 and the plunger 40 tends to raise the plunger when the nut 42 is loosened.

The plunger 40 carries on its upper end a resilient spring seating member 47 supporting a lower guide member 48 cooperating with an upper guide member 49 also carried by the upper end of the plunger 40 to provide longitudinal tracks or ways for contact slides 50 and 51. The slides 50 and 51 are provided with arc shaped contact points 52 and 53 respectively for tangentially engaging the conducting segments of the various strips 17 to 20 inclusive of the commutator 10. As clearly shown in Figs. 4 and 8 the contact points are formed upon the slides to extend below and to one side of the lower edge thereof. The lower edges of the contact points 52 and 53 extend a predetermined distance below the contact points and serve as contact surfaces 54 to engage the horizontal surfaces of the resilient brush springs 14, 15, and 16. The shape of the contact points 52 and 53 and contact surface 54 is clearly shown in Figs. 4, 7 and 8. By employing the arc shaped point the possibility of injuring the surfaces of the segments and the insulating material is reduced to a minimum. Alining springs 55 and 56 are adjustably mounted on the upper guide member 49 and assist in properly positioning and alining the fixture on the commutator. A framework 59 slidably mounted upon the top of the upper guide member 49 has two dependent arms 60 and 61 equipped with set screws 62 and 63 respectively, which are adapted to bear against the sliding guides 50 and 51 respectively, so as to carry the guides with the framework 59. An upright portion 64 of the framework 59 rotatably supports an adjusting screw 65, one end of which threadedly engages a block 66 fixed to the upper guide member 49. Thus the actuation of the adjusting screw 65 moves the framework 59 and the slide members 50 and 51 relative to the block 66 and the plunger 40. A projecting arm 68 extending from the framework 59 is provided for contacting with a feeler member 69 of an indicator gauge 70 attached in any suitable manner to the fixture. The gauge 70 may be of any suitable type, having a needle 71 responsive to movements of the member 69 to indicate on the associated scale 72 the extent of such movements, the scale preferably being graduated to indicate the travel of the member 69 in one thousandths of an inch. The scale 72 is also attached to and movable with a rim 73 so that the scale may be turned to bring any of the indications radially opposite the needle 71.

An incandescent lamp 75 of any suitable type may be mounted in a socket 76 also attached to the fixture member 25, one terminal of the lamp being in electrical contact with the framework of the fixture and therethrough with the contact slides 50 and 51, while the other terminal of the lamp is connected by means of a terminal 77, associated with the socket 76 by flexible conductor 79 to one terminal by a source of current 80. Another flexible conductor 81 connected to another terminal of the source 80 terminates in a suitable clip 82 for connecting to the brush spring or to the commutator segments as shown in Figs. 4 to 6 inclusive.

In the operation of the device, assuming that the seating of the brush 11 relative to the conducting segments on the right hand side, as viewed in Fig. 2, of the commutator 10 is desired, the brush rod 12 carrying the brush 11 is advanced through predetermined steps by a rack and pawl associated therewith (not shown) to a position, one segment below that selected for checking or testing (Fig. 4). By means of set screws 62 and 63 the contact point 52 of slide 50 is adjusted upon the framework 59 to travel over the surface of the segment of the conducting strip 17, while the contact point 53 on the slide 51 will entirely clear the commutator during such travel it being clamped by the screw 63 to the framework 59 in such a position that upon a movement of the framework 59 to the right as viewed in Figs. 1 and 3 the slide will not contact with the commutator. The alining spring 56 is adjustable on the guide member 49 so that it will bear against the left hand side (Figs. 1 and 2) of the commutator, while spring 55 is positioned on the member 49 so that it will not engage the commutator. The fixture is then attached to the commutator with the point 52 approximately level with or a trifle below the bottom edge of the selected segment on the strip 17 (Fig. 4). In attaching the fixture the front lugs 33 of the members 26 and 27 are placed in engagement with the front edge of the commutator and the alining spring 56 is placed against the left hand surface of the commutator, the brush rod 12 lying in the channels 28 and 29 of the arms 26 and 27 respectively. Set screw 35 is then actuated to draw member 31 forward until the lug 37 clamps tightly against the rear edge of the commutator (Fig. 1), the pins 30 cooperating with the openings 32 to guide the member 31. The clip 82 (Fig. 4) is then attached to the strip 17, and the thumb nut 42 is actuated to move the contact point 52 upwardly until the lamp 75 is lighted, thus indicating that the point 52 (Fig. 4) has made contact with the lower edge of the selected segment. The scale 72 is then turned by revolving the rim 73 of the gauge until the zero indication thereof is radially in line with the point of the needle 71. In this position the lower contact surface 54 of the point 52 is a predetermined distance below the lower edge of the segment surface. The clip 82 is then removed from the strip 17 and placed upon the brush spring 14 (Fig. 5).

By means of the nut 42 the slide 50 is then lowered a predetermined distance to extinguish the lamp 75. The rod 12 is then raised another step by the rack and pawl, and the brush 11 is unclamped therefrom. The brush 11 is then moved along the rod 12 by hand until the lamp 75 is again illuminated, this time indicating that the upper surface of the brush 14 has made contact with the contact surface 54 of the slide member 50 (Fig. 6). The slide 50 may then be raised a predetermined distance as indicated by the gauge, to represent the point at which it should disengage the spring 14. If the brush is properly adjusted on the brush rod, when this travel has been completed the lamp will be extinguished. If the lamp does not extinguish at this time, it will indicate that the brush has not been properly positioned and that further adjustments are necessary. When the brush has been properly positioned to make contact with the point 52 over a predetermined extent of travel of such point, the brush is securely clamped to the rod 12 by the clamping device 13. As a further check on the positioning of the brush, it may sometimes be desirable in a similar manner to check the positions of the contact surfaces of the springs 15 and 16 in relation to the associated contacting portions of the strips 19 and 20. It may also be advisable to check the position of the brush springs in regard to the upper edges of the conducting segments, as well as the lower edges.

The adjusting screw 65 serves to move the point 52 in a horizontal direction across the conducting segment to accurately determine its extent, provided the indicating circuit is connected as shown in Fig. 4. The vertical extent of the surface may also be accurately measured by means of the thumb nut 42, the lamp indicating when the point 52 engages and disengages the segment at its boundaries and the gauge indicating in fractions of an inch the travel of the point 52. When the circuit is connected, as shown in Fig. 6, the width of the springs 14, 15, and 16 may be checked by the movement of the adjusting screw 65.

In some cases it may be desirable to properly adjust the contact springs bearing against the left hand side of the commutator, in which case the alining spring 55 is moved toward the commutator to bear against the right hand side thereof, while the alining spring 56 is moved away from the commutator and the set screws 62 and 63 are employed to adjust the slide 51 upon the framework 59 so that the contact point 53 thereof will travel over the desired conducting segment on the left hand side of the commutator, while the point 52 of the slide 50 will be entirely clear of the commutator surface.

By means of this invention, the brush springs may be very accurately positioned in relation to a predetermined segment or segments made of the commutator, insuring that the brush springs will accurately cooperate therewith in response to the movement of the brush rod in predetermined steps. In this manner visual observations may be checked to determine their accuracy.

What is claimed is:

1. In an apparatus for determining the extent of a surface of an electrical conductor, a circuit connected to the conductor and including a source of current, a contact member connected with the circuit, means for causing a relative movement between the surface and the conductor during an engagement therebetween, means for measuring the extent of such relative movement, and a device associated with the circuit and producing a signal upon a disengagement between the surface and the member.

2. In a gauging apparatus for determining the adjustment between an electrical conductor and the contact surface of another electrical conductor designed to engage each other upon a predetermined relative movement therebetween, an electrical circuit including a source of current, a signaling device and a contact member, means for positioning the contact member a predetermined distance externally of the boundary of the surface, means for connecting the first-mentioned electrical conductor to the circuit, and gauging means associated and connected electrically with the contact member, designed to be engaged by the first-mentioned electrical conductor in response to a relative movement between the conductor and the surface to cause the device to produce a signal indicating the correct relative positions between the surface and the conductor.

3. In a gauging apparatus for determining the adjustment of a traveling member upon a carrier to engage a surface of a stationary member at a predetermined point in the movement of the carrier, an electric circuit, including a source of current, a signaling device and a contact member, means for moving the contact member a predetermined distance externally from the boundary of the surface, means indicating the extent of such movement, means for connecting the traveling member to the circuit, and gauging means associated with the contact member and adapted to be engaged by the traveling member in response to a movement thereof on the carrier to cause the device to produce a signal indicating the correct position of the traveling member upon the carrier.

4. In an apparatus for determining the position of a brush upon a brush rod in a panel type machine switching telephone exchange for engaging and disengaging commutator segments in response to stepping movements of predetermined length of the brush rod, an electric circuit, including a source of current and a contact member, means for moving the contact member a predetermined distance beyond the boundary of one of the segments, means controlled by the contact member to indicate the extent of movement thereof, a projection carried by the contact member for engagement with the contact spring of the brush when the brush is properly positioned on the rod, and a device included in the circuit for producing a signal responsive to such engagement.

5. In an apparatus for determining the extent of a surface of an electrical conductor, a circuit connected to the conductor, including a source of current, a contact member also connected to the circuit, means for moving the contact member over the surface, means for indicating the extent of travel of the contact member, and a device included in the circuit and producing a signal when the contact member passes over the boundaries of the surface.

6. In a gauging apparatus for determining the adjustment of a traveling member upon a carrier to engage a surface of a stationary member at a predetermined point in the movement of the carrier, an electric circuit, including a source of current, a signaling device and a contact member, means for connecting the circuit with the surface, means for moving the contact member relative to the surface to a predetermined surface externally of the boundary thereof, said device producing a signal when the contact member passes the boundary, means for indicating the extent of movement of the contact member beyond the boundary, and gauging means adapted with the contact member to indicate the correct position of the traveling member upon the carrier.

In witness whereof, I hereunto subscribe my name this 29th day of June A. D., 1923.

CHARLES BREVET EMERY.